H. W. STONE, Jr.

MIDDLINGS PURIFIER.

No. 11,132. Reissued Dec. 9, 1890.

Witnesses,

J. M. Witherow,

E. L. Siggers

Inventor,

Heman W. Stone Jr., by his Attorneys,

C. A. Snow & Co.

THE NORRIS PETERS CO., PHOTO-LITHO., WASHINGTON, D. C.

UNITED STATES PATENT OFFICE.

HEMAN W. STONE, JR., OF MORRIS, MINNESOTA.

MIDDLINGS-PURIFIER.

SPECIFICATION forming part of Reissued Letters Patent No. 11,132, dated December 9, 1890.

Original No. 375,782, dated January 3, 1888. Application for reissue filed August 10, 1889. Serial No. 320,424.

*To all whom it may concern:*

Be it known that I, HEMAN WARD STONE, Jr., a citizen of the United States, residing at Morris, in the county of Stevens and State of Minnesota, have invented a new and useful Improvement in Middlings-Purifiers, of which the following is a specification.

My invention has reference to middlings-purifiers; and it consists in the improved construction hereinafter described, and set forth in the claims, whereby a purifier is provided in which the material is more effectively purified than heretofore, the action of the air is made variable to regulate the purification, and the arrangement of devices in the lower part of the chest is such as to properly separate the material.

Sieve-purifiers as heretofore made will not clean middlings well enough at one operation for patent flour. Impurities will pass through the sieve all the way from head to tail. The sieve of a purifier is an excellent grader, and but little more.

It is the object of my invention to form a combined sieve and aspirating purifier especially adapted for the cleaning of sized middlings, which contain a considerable portion of an intermediate grade of stock, which grade is too good for offal and too impure for patent flour. It is this grade of middlings which sifts through the sieve of all sieve-purifiers near the tail of the same and which makes the middlings from near the tail more impure than those from the head of the machine.

To accomplish the proper separation of this intermediate grade from the middlings, I utilize a current of air and so control this air-current that the same air which passes through the middlings at the lowest separating-point also passes through the middlings at each of the other separating-points, and also through the sieve, whereby the proper cleaning effect is gained without increasing the cost of the machine, the space occupied by it, or without rendering necessary an increase in the power required to operate it.

Figure 1:
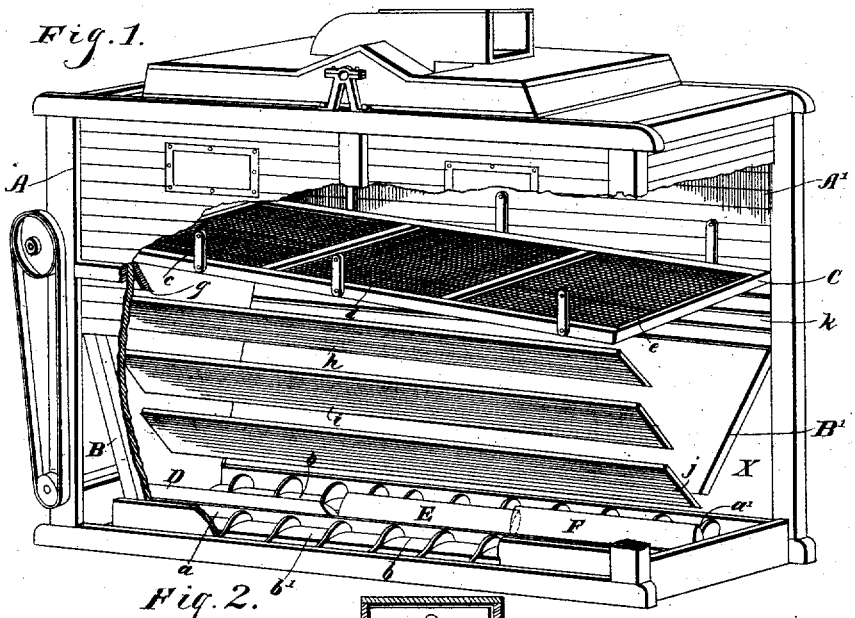
Figure 2:
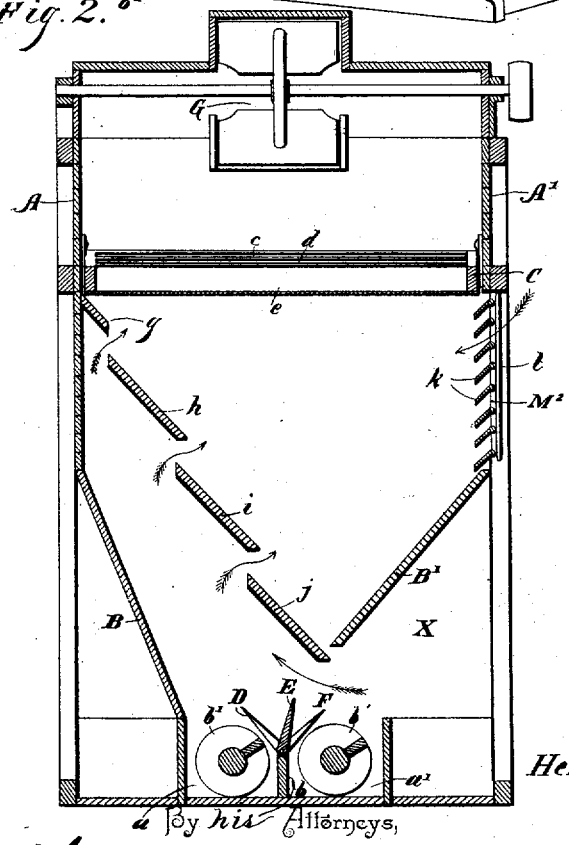

In the accompanying drawings, forming part of this specification, Figure 1 is a perspective view of a middlings-purifier, a portion of one end and the side of the chest being removed to more clearly show my invention; and Fig. 2 is a transverse vertical sectional elevation of my improved purifier.

In the description and operation of my said improved machine the distinct grades constituting the material acted upon in the chest will be referred to as follows: the middlings, the offal, and an intermediate grade which is valuable for some purposes, and which it is an object to secure in a separated condition.

The sides A A′ of the chest are of the usual construction, and have the lower tapering walls B B′, which lead down to the double conveyer-boxes *a a′*, separated by a central partition *b*, and each of which has located therein a conveyer-screw *b′*, suitably journaled and driven by any suitable means from one of the other driving portions of the purifier. The side B′ inclines more abruptly than the side B, and does not extend to the conveyer-boxes, a horizontal opening X being thus formed between said conveyer-box and the side B′.

The horizontal riddle C is located in the upper portion of the machine in an inclined position, and is vibrated by any suitable means.

By reference to Fig. 1 it will be noted that the cloth or screening surface of the riddle is divided into a series of sections *c d e*, &c., which are formed of different-sized mesh, as will be readily understood. On the central partition of the conveyer-boxes is hinged or pivoted a series of deflector-plates D E F, each of which registers vertically with one of the divisions of the riddle above.

*g h i j* refer to a series of transversely-inclined longitudinal plates, which are also located in inclined series, one below the other, so as to extend the length of the chest, beginning at one side adjacent to the sieve and terminating adjacent to the lower edge of the oppositely-inclined side B′. It will be noted that the arrangement of the plates is such that the grain can pass from one onto the other, while air-passages are formed between said plates. Said plates are imperforate, so that all the meal deposited on one plate is compelled to drop upon the plate below and cannot escape, as would be the case were the plates perforate. These plates provide an inclined plane or chute for the descent of the middlings to the conveyer-boxes. An opening $M^2$ is formed in the side A′, above the lower opening X, and is provided with a series of pivotal slats *k*, which are operated in series by a vertical bar *l*, connected therewith.

In operation the fan G causes the air entering through the opening X to rise through the riddle and carry off the offal or lighter particles. The material as it descends passes gradually from one plate to the next below. By the time the material is about to pass to the conveyer-boxes it consists, principally, of middlings and the intermediate grade hereinbefore referred to. Said middlings and intermediate grade pass in a thin stream to the conveyer-boxes, said stream being subjected to the current of air on its entrance to the chest through the opening X, the said current effecting the separation of the intermediate grade from the middlings. The latter, being the heavier, drop by gravity into the conveyer-box below, whereas the current of air drives the intermediate grade into the other conveyer-box. If the current of air is such that it will not act forcibly on the intermediate grade, the decrease may be provided against by throwing the valve-plate F over to the position shown. It will readily be understood that the intermediate grade will not then need to be carried so forcibly by the current to deposit it in its box.

It is well known that the middlings, as they come from the purifier-sieve and before they are again mixed by the conveyers, are in the best possible condition for being repurified and by an air-current alone, for they are not only graded according to size, but a large proportion of the impurities, regardless of their size, are removed from the fine to the coarse middlings, from which latter they can be more easily separated than from the former, because of the greater difference in specific gravity. Of this favorable condition complete advantage is taken by the improved purifier herein described with the results as stated.

It will be understood that the admission of air into the casing through the opening X is accelerated by the action of the suction-fan G, which in operation tends to draw the air in an ascending current to the top of the casing through the riddle.

Particular stress is laid on the fact that all of the air-current which passes through the middlings as they reach the conveyer-boxes and separates the intermediate grade therefrom also passes upward through the spaces separating the sections *g h i j*, and then through the riddle or screen and carries off the offal or lighter particles from the screen.

The object in making the plates *g h i j* separate is to provide openings between each plate for the passage of the air-current. If these openings between the plates were closed, there would be no air-current passing over the conveyer-boxes; but all the air would be compelled to enter at the opening $M^2$, and the very object of this invention—viz., the separation of the intermediate grade—would be defeated. Were it necessary, but one plate could be used, the opening for the air-current being around the upper edge of such a plate. I prefer several plates and several openings, so as to allow a more even distribution of the air-current below the sieve. Where only a single plate is used a stronger air-current passes through the sides of the sieve than through the center.

I do not wish to be understood as claiming, broadly, the use of a current of air to effect the proper purification of middlings. This, I am aware, is old in this art.

My improvement resides in the peculiar circulation of the air-current, whereby the same air which acts on the middlings as they drop into the conveyer-boxes also passes up and acts on the material on the riddle or screen.

In this machine there are two points where the middlings are separated by the air-current—viz., first, the sieve, which is, say, forty inches wide, at which point the air-current should be strong enough to lift and carry the offal to the fan; second, between the lower edge of plate *j* and the upper edge of the conveyer-boxes, this latter separating-point being, say, six inches wide. Now if the air-current at this point is too strong it will remove good middlings into the conveyer-box, in which only the intermediate grade belongs, and also lift some of the intermediate grade back into the chamber or chute below the sieve, instead of depositing it into the conveyer-box provided for it. Now it is evident that if all the air-current which passes the first-mentioned separating point (forty inches wide) is compelled to pass the second separating-point (only six inches wide) it will have a much greater velocity at the latter point than at the former. The air-current might be able to lift only offal from the screen, and yet lift good middlings from the conveyer-boxes.

From the foregoing the importance of using means for controlling the velocity of the air-current which passes over the conveyer-boxes will be appreciated. To do this successfully, the opening $M^2$ with its pivoted slats is provided.

Sometimes middlings-purifiers are so heavily loaded and the sieve so thickly covered with middlings that but little of the air can pass through the sieve. In many such cases the opening $M^2$ is kept entirely closed. It is evident that as the pivoted slats are opened the amount of air entering at $M^2$ will be increased, while the amount and velocity of the air entering the lower opening X and passing over the conveyer-boxes will be correspondingly decreased. If the slats are closed it will have a contrary effect. Thus it will be seen the opening $M^2$, with its adjusting devices, is simply employed as a means for regulating the amount and velocity of air entering the lower opening X, and for no other purpose whatever.

The varying mesh of the riddle requires that the different valve-boards be in different positions, since the quantity and nature of the material passing to the conveyer-box at different points will also vary. This contingency is provided for by having the valve-boards independently adjustable, as explained.

From the foregoing it will be obvious that the middlings-purifier embodying my improvements is adapted for high and efficient degree of service, and that the novel features are of such simple character as to enable them to be readily applied to existing machines without great expense.

I claim—

1. In combination with the casing A, the riddle consisting of a series of screens of varying-sized mesh, all of said screens being on the same plane, the downwardly-inclined separate plates *g h i j*, extending longitudinally of the casing below the riddle, said plates being arranged one above the other with a space separating their adjoining edges, whereby the meal can pass from the riddle onto the plates and then pass from one plate to the other, the suction-fan G, located at the top of the casing above the riddle and providing an ascending current of air through the riddle, the conveyer-boxes below the plates and receiving the meal therefrom, and the hinged deflector-plates D E F, registering vertically with one of the divisions of the riddle above, as set forth.

2. The combination of the casing A, the suction-fan G at the top thereof, the riddle C, arranged longitudinally within the casing below the suction-fan, so that the latter will cause an ascending current of air to pass through the riddle, the opening $M^2$ in one side of the casing below the riddle, adjusting-slats *k*, the opening X in the casing below opening $M^2$, and the chute arranged below the riddle and having the series of transversely-inclined longitudinal plates located one above the other in an inclined series, and having their adjoining edges separated by an intervening space, whereby the air entering through the opening X circulates through the spaces between the said inclined plates and passes up to the screen, as set forth.

3. In combination with the casing of the machine, having an opening in the side A′ thereof, the suction-fan, the vibrating riddle consisting of a series of screens of varying-sized mesh, the downwardly-inclined plates *g h i j*, extending longitudinally of the casing, the slats *k k*, covering the opening in the side A′, the boards B and B′, forming the chute, the downwardly-inclined deflector-plates D E F, the conveyer-partitions *b*, to which said latter plates are hinged, and the two conveyers *b′ b′*, substantially as described.

4. In a middlings-purifier, the casing A, having the suction-fan G at the top, the riddle C, arranged within the casing below the fan, the air-inlet opening $M^2$ in one side of the casing below the riddle, having adjusting means, the opening X at the side near the bottom, the conveyer-boxes at the bottom, and the inclined plane conveying the middlings from the riddle to the conveyer-boxes, a small space separating the lower end of the inclined plane from the said boxes, whereby the air admitted through opening X is caused to traverse the said space and separate the intermediate grade from the middlings, the air-current then passing upward and acting on the middlings upon the riddle, as set forth.

5. In a middlings-purifier, the casing having the suction-fan G at the top, the riddle C, arranged within the casing below the fan, the conveyer-boxes at the bottom, the opening X in the side of the casing substantially on a plane with the top of the conveyer-boxes, and the regulating-opening $M^2$ in the side of the casing above the opening X, for the purpose set forth.

In testimony that I claim the foregoing as my own I have hereunto affixed my signature in presence of two witnesses.

HEMAN W. STONE, JR.

Witnesses:
J. A. JOHNSON,
WM. C. BICKNELL.